United States Patent [19]

Chappell

[11] 4,341,418
[45] Jul. 27, 1982

[54] CAR SEAT HIDE-A-WAY TABLE

[76] Inventor: Austin Chappell, 739 E. 1st South, Kaysville, Utah 84037

[21] Appl. No.: 183,024

[22] Filed: Sep. 2, 1980

[51] Int. Cl.³ .............................................. A47C 7/62
[52] U.S. Cl. ...................................... 297/192; 5/507; 108/44; 224/275; 312/235 A
[58] Field of Search ............................ 108/44, 45, 46; 312/235 A; 5/507, 503; 297/162, 192, 135; 224/275

[56] References Cited

U.S. PATENT DOCUMENTS

| | | | |
|---|---|---|---|
| 3,195,850 | 7/1965 | Steiner | 5/507 X |
| 3,623,683 | 11/1971 | Bennett | 224/275 |
| 3,820,841 | 6/1974 | Andrews | 297/192 X |
| 3,949,917 | 4/1976 | Mann | 224/275 |

FOREIGN PATENT DOCUMENTS 2647511  4/1978  Fed. Rep. of Germany ........ 108/44

Primary Examiner—James T. McCall
Attorney, Agent, or Firm—Thorpe, North & Western

[57] ABSTRACT

A car seat table capable of being stored and removed from under a car seat for use as a table or resting shelf consisting of three sections divided from one another by hinges. The table is held in an upsidedown storage position by guide runners which are centrally positioned in alignment on each table section and which slides along a track mounted on the bottom of said car seat for storage. To erect the table for use, the first or tray section, pulls out and bends up at a hinge, followed by the second section which is divided into a riser and cup portion. The second section is folded to a vertical position causing the tray section to become horizontally extended over the car seat. The riser is connected to a third section which remains on the track and the cup section is rotated to and supported in a forwardly extending portion in the same plane as the tray section.

7 Claims, 7 Drawing Figures

CAR SEAT HIDE-A-WAY TABLE

BACKGROUND OF THE INVENTION

The present invention related to a car seat table which is capable of being stored beneath a car seat and then pulled out for use. More specifically, it relates to a hide-a-way table which is storable under a bench or divided car seat and which is slidable along a track mounted under said seat.

Automobiles are used both for short excursions and for longer trips and many people eat while driving in the car. To the driver this may present a problem as he must pay attention to the road and driving conditions as well as trying to eat and drink without spilling on himself. Many cars with bucket seats have trays or shelves positioned between the front bucket seats on which may be placed items of food and drink. However, for cars with bench car seats, there is no table or tray available and the driver must somehow provide means to prevent his food and drink from spilling while driving.

OBJECTS AND SUMMARY OF THE INVENTION

It is an object of the present invention to provide a food and drink retainer or table which is attachable to and storable under a car seat.

It is another object of the present invention to provide a table for car seats that is slidable along a track mounted under the car seat.

It is a further object of the present invention to provide a table for car seats which may be quickly and easily assembled.

These and other objects may be met by a table consisting of multiple folding sections. Along the length of the underside of said table is a guide runner which fits over and slides along a track mounted on the bottom of the car seat. The multi-section table is stored under the seat in an upsidedown position when not in use by sliding it along the track. In order to use the table, it is pulled part way from under the seat exposing the first or tray section of the multiple sections. This section is folded upward, it being hinged to the intermediate section. The intermediate section is then slid out along the track. The intermediate section is similarly folded upward due to a hinge between it and the last or support section. The last section is positioned with the runner remaining on the track in order to support the other two sections which have been folded out. The tray section is horizontal and at right angles to the intermediate section and folds back over the seat as a table while the intermediate section is vertical and perpendicularly positioned to the table at the front edge of the car seat. The intermediate section consists of three parts: (1) a vertical riser which connects the tray and support sections; (2) a cup holding section which swings outward and upward away from the vertical riser to be in alignment with the tray section; (3) bracing means which holds up the cup section in position. The last section remains attached to the track but because it is not permanently attached, the entire table unit may be removed to be cleaned or repaired. The preferred embodiment will hereinafter be described in greater detail.

DRAWINGS OF THE INVENTION

DETAILED DESCRIPTION OF THE INVENTION

There is shown in FIG. 1–7, a complete embodiment of the invention and a method of assembly.

Figure 1:
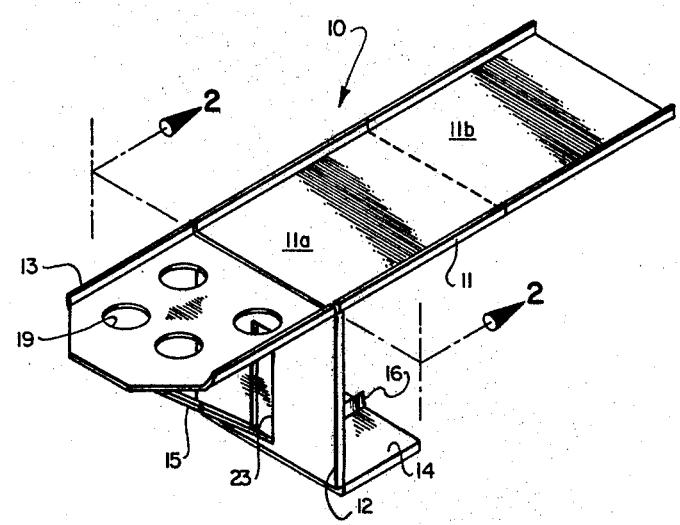
FIG. 1 is a pictoral view of one embodiment of the car seat table in an assembled position.
Figure 2:
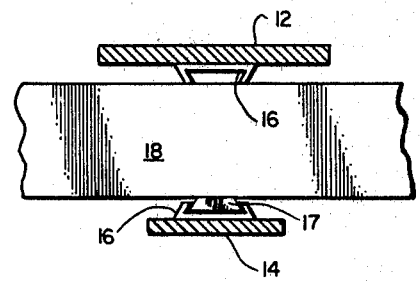
FIG. 2 is a front cross-section view taken along lines 2—2 of FIG. 1. showing one configuration of the track and the guide runner inserted thereon.
Figure 3:
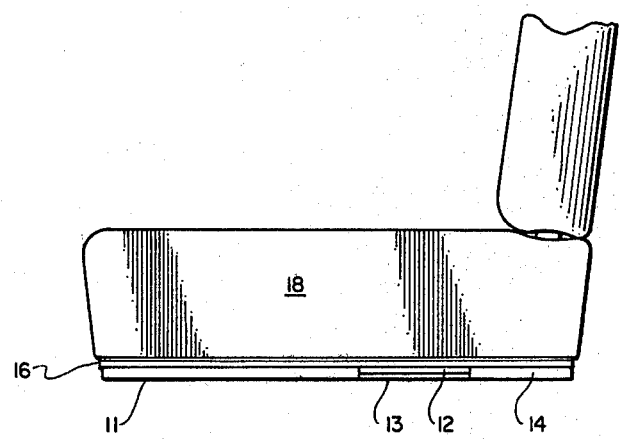
FIG. 3 is a side view of a car seat with the car seat table stored underneath in an unassembled position.

FIG. 1. shows a car seat table 10 which consists of a tray section 11, an intermediate section, divided into a riser 12 and a cup section 13, and a support section 14. The riser 12 and cup section 13 sections also contain bracing means 15 to hold the cup section 13 in a horizontal position which is in alignment with the table section 11 and perpendicular to the riser 12 when the the table is in an assembled position. Each of the various sections are connected to an adjacent section by hinge means. Each of the sections, with the exception of the cup portion 13 of the intermediate section contain a guide runner 16 on the underside thereof, which is shaped to mate with a track 17 mounted on the bottom of a car seat 18 a spaced distance above the floor.

The invention is preferably utilized in cars having bench seats and is attached under the portion of the seat just above the hump in the floor which accommodates the transmission and drive train. There must be sufficient clearance between the bottom of the seat and the floor to accommodate the track and table. The table may also be utilized on either side of a divided bench seat which can accommodate the width of the table and leave sufficient room for the driver or passenger to be seated. The table could also be assembled under a bucket seat on the passenger side and be assembled for the benefit of a driver when the front passenger seat was not occupied.

Because the tray section 11 has greater length than the other sections, it may be necessary to divide it into two or more sections 11a, 11b, etc. hinged to each other in order to be able to pull that section out from under the car seat. This is especially the case in automobiles having a standard transmission where the shifting lever is located on the floor just in front of the seat.

The tray section 11 preferably has a rim around the outer perimeter to prevent spillage onto the car seat. The cup section 13 contains one or more holes 19 sized to hold beverage containers and keep them from spilling.

The table as illustrated in the drawings consists of three sections as described with the division of the table section 11 into sections 11a and 11b being shown by a dotted line.

Figure 7:
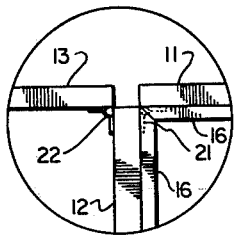
FIG. 7 is an enlarged view of the double hinged juncture of the riser with the cup portion and the tray section as shown in FIG. 6.

The unit is installed in an automobile by securing a track 17 to the bottom structure of a car seat 18 in an area convenient to the driver where there is sufficient clearance under the seat for storage of the table. The guide runner 16 is in sections and is centrally secured to the appropriate table sections so that the various runner sections are in alignment but do not inhibit the folding of the various table sections to a position where the surfaces containing the runners are at 90° angles to each other. If the guide runners are cut at 45° angles as shown in FIG. 7. the angled surfaces meet and support adjacent table sections when at right angles to each other.

The support section 14 is connected to the riser 12 by means of one or more hinges 20. A single piano hinge could be used or two or more cabinet or strap hinges may also be employed. Similarly, the riser 12 is connected at the opposite end to the tray section 11 by the same type of hinges 21. The cup section 13 is also attached to the riser 12 at the same end as the table section 11 by hinge means 22 located on the riser 12 surface opposite the surface containing hinge means 21 as shown in FIG. 7.

The table 10 is stored in an upsidedown position with the various portion to the running guide 16 being mounted on the track 17 under the seat 18.

Figure 4:
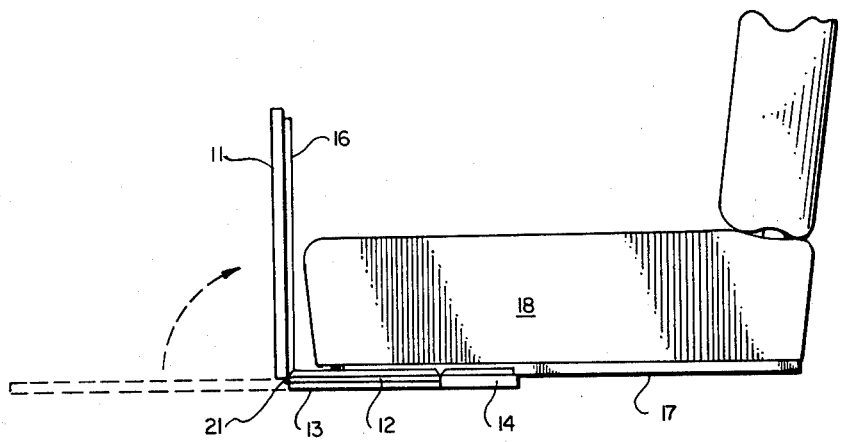
FIG. 4 is a side view as in FIG. 3. with the car seat table in a first stage of assembly.

The table is assembled by sliding the table 10 along the track 17 out from under the seat 18 until the tray section 11 is clear of the track and front edge of the car seat as shown in FIG. 4. This section is folded upwardly and the next section is pulled out. If the tray section is divided into two or more sections, the procedure is repeated as many times as necessary so that the entire tray section is removed from under the seat. If necessary, the various tray sections may be inflexibly secured to each other by sliding bolts and the like.

Figure 5:
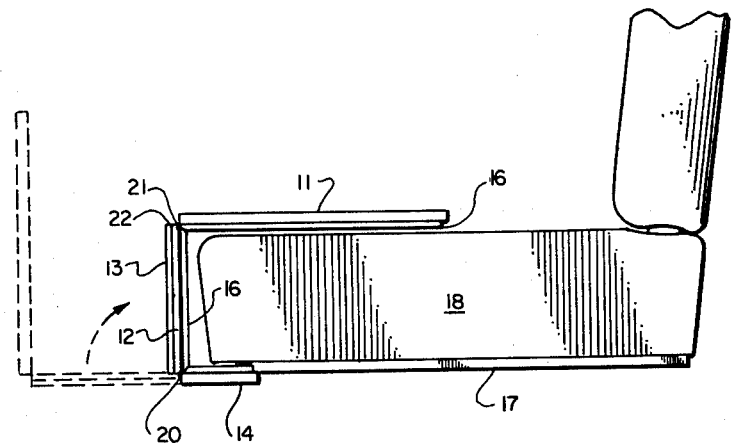
FIG. 5 is a side view as in FIG. 4 with the car seat table in a second stage of assembly.
Figure 6:
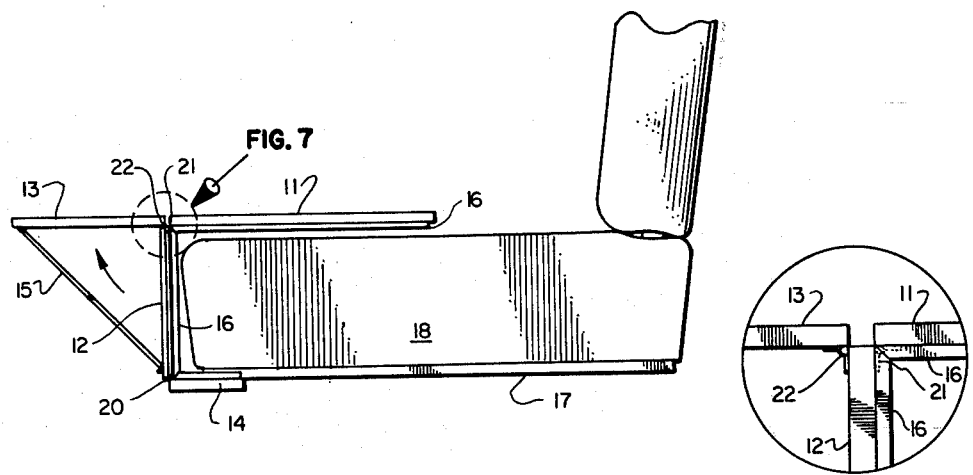
FIG. 6 is a side view as in FIG. 5. with the car seat table completely assembled.

Once the tray section has been removed from under the seat and folded to a vertical position, the intermediate section consisting of the riser 12 and cup portion 13 is slid out from the track and folded to a vertical position as shown on FIG. 5. The tray section 11 thus assumes a horizontal position extending back over the top of the seat and resting on the front edge of the seat surface as shown on FIG. 5. Support section 14 remains slidably secured to track 17 to hold the table in position. With the table in this stage of assembly, the cup portion 13 is swung outwardly and upwardly away from the riser 12 about hinge 22 to lie in the same horizontal plane as the tray section 11 and is locked in place by bracing means 15 as shown in FIG. 6.

Various types of bracing means may be utilized. A foldable, locking brace hinged at either end is shown in FIG. 6. Such a brace will fold as the cup section 13 is lowered and may fit into a recess in riser 12 when the cup section 13 rests against the riser. An adjustable fold-down brace which folds down from the end of the cup section and rests on the car floor in a vertical position is one alternative. A second alternative is a rigid rod the ends of which fit into notches located in the underside of the cup section and along the outer surface of the riser.

If desired, the support section may also be slid away from the track and the car seat table completely removed from the car.

Preferably, the table 10 is constructed of durable plastic or wood having a metal, teflon or nylon runner 16 and track 17. The runners are preferrably constructed such that at each hinged section they are cut at a 45° angle so that they rest against one another as shown in FIG. 7.

If desired, it is possible to vary the width of tray section 11 and cup section 13 by the use of hinged wings laterally located on the sides of these sections which fold outwardly and lock into position once the table is assembled. The table may run along parallel tracks instead of a single track. These and other modifications may be made without departing from the scope of the invention which is to be limited only by the appended claims.

I claim:

1. A foldable car seat table assembly capable of being stored under the seat of a car when not in use comprising:
   (a) a track mountable under a car seat,
   (b) a three sectioned table unit, each section of which is foldable at right angles to an adjacent section and is attached to an adjacent section by hinge means, with each section being in the same plane when unfolded comprising:
      (1) a tray section
      (2) an intermediate section divided into a cup portion having apertures therein and a riser portion and
      (3) a support end section said tray section and cup portion being connected to said riser portion at the same end thereof by separate hinge means such that when said tray section and cup portion are rotated about said hinge means to be at 90° angles from said riser they will project in opposite directions and be aligned in substantially the same plane, said support end section being connected to the opposite end of said riser portion by hinge means such that when said tray and support sections are folded at right angles to said riser they will extend in the same direction from said riser in a parallel relationship;
   (c) guide runner means adapted to mate with and slide along said track attached to one surface of each section of said multisectioned table, in an aligned position, and
   (d) supporting means to retain said cup portion at right angles to said riser portion when said car seat table is in as assembled position.

2. A car seat table according to claim 1, wherein the tray section is rectangular in shape.

3. A car seat table according to claim 2, wherein the guide runner means are angled at the ends thereof at 45° angles and are of sufficient length that when adjacent table sections are folded at right angles, the angled ends of the guide runner means will meet and support such adjacent table sections.

4. A car seat table according to claim 2, wherein the tray section is divided into additional sections which are hinged to fold in the same direction as the tray section folds from the riser.

5. A car seat table according to claim 4 wherein the divided tray sections contain means to lock them in a common horizontal plane when the table is assembled.

6. A car seat table according to claim 2, wherein the supporting means is a foldable brace which locks in an extended position.

7. A car seat table according to claim 2, wherein the supporting means is a vertical support which folds down from the front end of said cup portion.

* * * * *